United States Patent [19]

Narayanan

[11] Patent Number: 5,409,675
[45] Date of Patent: Apr. 25, 1995

[54] HYDROCARBON PYROLYSIS REACTOR WITH REDUCED PRESSURE DROP AND INCREASED OLEFIN YIELD AND SELECTIVITY

[76] Inventor: Swami Narayanan, 1723 Beacon Cove Ct., Katy, Tex. 77450

[21] Appl. No.: 232,822

[22] Filed: Apr. 22, 1994

[51] Int. Cl.$^6$ .............................................. B01D 3/04
[52] U.S. Cl. .................................... 422/197; 165/146; 165/147; 165/183; 196/110; 196/116; 422/198; 422/202; 422/204
[58] Field of Search ............... 422/197, 196, 202, 204, 422/198; 196/110, 116; 165/146, 147, 903, 183; 122/235.14, DIG. 13, 367.2, 367.3

[56] References Cited

U.S. PATENT DOCUMENTS

| | | |
|---|---|---|
| 2,018,163 | 10/1935 | Wells ..................................... 165/147 |
| 2,181,927 | 12/1939 | Townsend ............................ 165/147 |
| 2,994,724 | 8/1961 | Hillard, Jr. et al. . |
| 3,267,564 | 8/1966 | Keyes ................................... 165/183 |
| 3,348,923 | 10/1967 | Demarest ............................. 196/110 |
| 3,572,999 | 3/1971 | Sato et al. . |
| 3,600,922 | 8/1971 | Schmelling et al. . |
| 3,671,198 | 6/1972 | Wallace . |
| 3,964,873 | 6/1976 | Aramaki et al. . |
| 4,016,066 | 4/1977 | Shiraiwa et al. . |
| 4,085,034 | 4/1978 | Endo et al. . |
| 4,127,473 | 11/1978 | Hozuma et al. . |
| 4,194,966 | 3/1980 | Edison et al. . |
| 4,412,560 | 11/1983 | Broodman . |
| 4,457,364 | 7/1984 | Dinicolantonio et al. . |
| 4,492,624 | 1/1985 | Johnson et al. . |
| 4,499,055 | 2/1985 | Dinicolantonio et al. . |
| 4,657,074 | 4/1987 | Tomita et al. .................. 165/183 X |
| 4,765,883 | 8/1988 | Johnson et al. . |
| 4,777,318 | 10/1988 | Martens et al. . |
| 4,792,436 | 12/1988 | Tsai . |
| 4,999,089 | 3/1991 | Nakase et al. . |
| 5,139,650 | 8/1992 | Lenglet . |
| 5,147,511 | 9/1992 | Woebacke . |
| 5,151,158 | 9/1992 | Bowen et al. . |
| 5,181,990 | 1/1993 | Arisaki et al. ........................ 196/110 |

FOREIGN PATENT DOCUMENTS 105152  1/1927  Austria ............................... 165/147

OTHER PUBLICATIONS

T. C. Carnavos, *Heat Transfer Performance of Internally Finned Tubes in Turbulent Flow,* Heat Transfer Engineering, vol. 1, No. 4, Apr.–Jun. 1980, pp. 32–37.

Kim, N. & Webb, R. L., *Analytic Prediction of the Friction and Heat Transfer for Turbulent Flow in Axial Internal Fin Tubes,* Journal of Heat Transfer, vol. 115, Aug. 1993, pp. 553–559.

Froment, G. F. et al., *Thermal Cracking of Ethane and Ethane–Propane Mixtures,* Ind. Eng. Chem., Process Des. Dev., vol. 15, No. 4, 1976, pp. 495–504.

Van Damme, P. S. et al, *Thermal Cracking of Propane and Propane–Propylene Mixtures: Pilot Plant Versus Industrial Data,* AIChE Journal, vol. 21, No. 6, Nov. 1975, pp. 1065–1073.

Primary Examiner—Amalia L. Santiago
Attorney, Agent, or Firm—Pravel, Hewitt, Kimball & Krieger

[57] ABSTRACT

An enhanced hydrocarbon pyrolysis reactor for the production of olefins. The reactor provides enhanced heat transfer, reduced pressure drop, and reduced energy requirements while increasing selectivity and olefin yield. The radiant section tubes of the reactor, according to the invention, are shaped to provide a continuously increasing volume per unit length from inlet to outlet of the reactor. This increase in volume may be achieved by either expanding the effective inside radius of the reactor tube and/or increasing the outside radius of the tube while increasing the inside effective radius. Alternatively, since embodiments of reactors according to the invention have internal fins, the fin size and shape may be modified to provide the required increasing volume per unit length.

10 Claims, 1 Drawing Sheet

HYDROCARBON PYROLYSIS REACTOR WITH REDUCED PRESSURE DROP AND INCREASED OLEFIN YIELD AND SELECTIVITY

BACKGROUND OF THE INVENTION

1. Field of the Invention

The invention relates to an improvement in olefin production from hydrocarbon cracking (pyrolysis) that reduces pressure drop, improves heat transfer, reduces energy requirements, and increases yield and selectivity. More particularly, the invention provides a modified radiant section of a hydrocarbon cracking reactor wherein the internal volume per unit length of a tubular or plug flow radiant heat-receiving reactor section increases from inlet to outlet and wherein the internal surfaces of the reactor are extended to provide improved heat transfer for enhanced reaction rates while not significantly adversely affecting pressure drop through the reactor.

2. Description of the Related Art

It is known to produce olefins by thermally decomposing ("pyrolyzing" or "cracking") hydrocarbons in a pyrolysis furnace supplied with tubes that comprise a tubular or plug-flow reactor through which feedstock flows and in which the feedstock is thermally decomposed. A pyrolysis furnace is designed to transfer heat to internal reactor tubes which are conventionally arranged in three sections: a convection section, in which the hydrocarbon feedstock is preheated; a radiant section, in which the preheated hydrocarbon feedstock is thermally decomposed to olefins, diolefins, and aromatics; and a quench section where the effluent from the radiant section is cooled.

In order to enhance selectivity and yield of a desired olefin, attention is usually focused on the radiant section of the reactor where most of the thermal cracking reactions occur. A typical radiant section of a pyrolysis reactor consists of tubes or coils arranged within the furnace so that they are subject to radiant heat from burning fuel. The hydrocarbon feedstock resides in this radiant section for only a short period of time (referred to as the radiant tube "residence time"). It is generally recognized that the residence time in the radiant section should be as short as possible to arrest other decomposing reactions so that the production of unwanted polymers and tars is minimized. Thus, for improved selectivity towards desired olefins, a short residence time regarded as optional.

Further, it is known that when the hydrocarbons undergo thermal cracking, there is a net increase in the number of moles present in the reactor. As a result, the pressure in the reactor is expected to increase due to the increase in number of moles. This pressure increase in turn acts to retard the rate of pyrolysis reaction producing desired olefins, in accordance with Le Chatelier's principle.

Generally, when feedstock enters the radiant section reactor, it is first heated up to a temperature where pyrolysis reaction rates become significant. Up to this point in the reactor, molar (and hence volume) expansion is not very significant and pressure drop is not a significant issue. Thus, the primary focus is on heat transfer to the feedstock. However, further along the reactor where the temperature is sufficiently high that rapid pyrolysis reaction takes place, pressure drop concerns arise. Typically, extended inner surface tubing used in current reactors allow rapid heat transfer to heat up incoming feedstock but the extended surfaces give rise to increased pressure drop in those sectors of the reactor where significant pyrolysis and attendant molar increase takes place.

Therefore, it would be desirable to provide a reactor wherein heat transfer is enhanced in the zone where the feedstock is initially heated up without significantly adversely affecting pressure drop and wherein the pressure does not increase, or increases only marginally, in the zones where the thermal cracking reaction predominates. It is further desirable to improve the yield of olefins, and reduce the yield of polymers and tars (i.e., improve selectivity in favor of olefins and thereby increase yield of olefins), thereby conserving energy and resources needed in the pyrolysis process.

SUMMARY OF THE INVENTION

The invention provides an improved pyrolysis furnace-type reactor for thermally decomposing hydrocarbons to olefins. According to the invention, a section of a pyrolysis furnace that contains a tubular or plug flow reactor that is exposed to radiant heat, is modified to significantly reduce pressure drop while maintaining high rates of heat transfer in the reactor thereby increasing selectivity of the pyrolysis reaction and improving the yield of olefins. As a result, energy is also conserved in that a greater yield of olefin is obtained for a given heat input to the reactor.

The improved radiant heat reactor includes tubes disposed in the radiant heat section of a pyrolysis furnace. The tubes have an inlet into which is charged hydrocarbon feedstock, and an outlet from which olefin product and residual uncracked hydrocarbon feedstock flows. In order to minimize pressure drop, according to the invention, the internal volume per unit length of the tubes making up the radiant heat reactor increases from the inlet to the outlet of the reactor. Thus, as the pyrolysis reaction takes place, and the number of moles in the reactor increases, the tube volume per unit length also increases so that pressure drop is minimized. This decrease in pressure drop, relative to the prior art constant internal diameter (constant volume per unit length) tube reactors, facilitates the pyrolysis reaction thereby increasing yield and selectivity for olefins.

Further, according to the invention, the internal surface of the tubing that is used to fabricate the tubular radiant heat reactor has structure that increases the surface area above that of a smooth cylinder, such as an extended surface, to increase the surface area in contact with the mixture of hydrocarbon feedstock and pyrolysis product. Thus, the tubes may, for example, be rifled or provided with internal fins to increase the surface area from which radiant heat can be transferred from the tubing to the mixture.

According to the invention, the extended surfaces are more pronounced at the inlet of the reactor (i.e., provide greater surface area enhancement) to allow rapid heat transfer to heat up the charge. At the point in the reactor that the charge approaches a predetermined temperature where the pyrolysis reaction is significant, the extended surface may be modified to allow increased volume per length of tube at the expense of surface area per length of tube while still retaining some of the heat transfer benefits of an extended surface. Alternatively, the effective inside diameter of the tube may be increased by increasing the tube diameters. The surface modification or tube diameter expansion is desirably continued to the reactor exit so that volume per tube length increases at a predetermined rate as the reactor tube extends towards the reactor exit. Thus, the invention allows for better heat transfer and thereby reduced energy consumption while minimizing pressure drop.

The invention provides an improved pyrolysis reactor for the production of olefins from hydrocarbons that has reduced pressure drop, better heat transfer, higher yield of olefins, and lower overall energy requirements for each unit of olefin produced.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENTS

Figure 1:
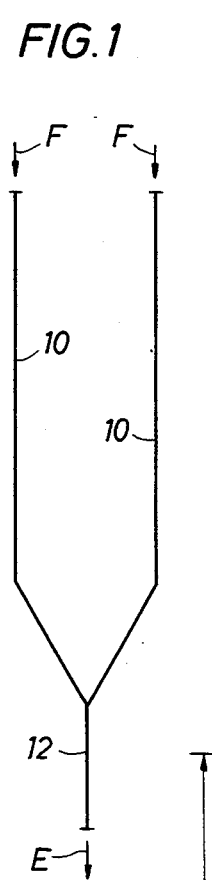
FIG. 1 is a schematic representation of pyrolysis reactor tubes in a radiant section of a hydrocarbon pyrolysis reactor for producing olefins.

The invention is more easily understood with reference to the accompanying drawings, FIGS. 1 and 2A–2E, none of which are to scale and all of which are illustrative schematics. FIG. 1 is a schematic view of a hydrocarbon pyrolysis reactor located within the radiant heat section of a pyrolysis furnace. The reactor includes tubes 10 for receiving a hydrocarbon charge F. As the charge F flows through tubes 10, it is heated, pyrolyzed, and expelled into exit tube 12. Reactor affluent E flows from exit tube 12 and is then further processed and separated into olefins and unreacted feedstock.

Figure 2A:
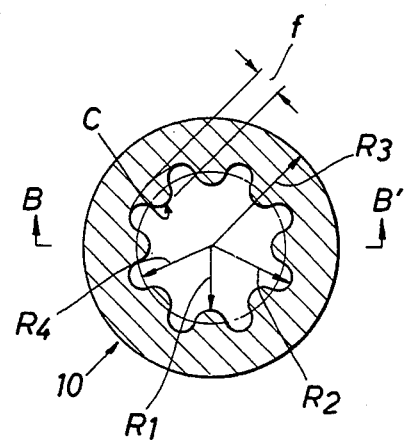
FIG. 2A is a cross-sectional view of a finned tube used as a tubular reactor in a hydrocarbon pyrolysis furnace.
Figure 2D:
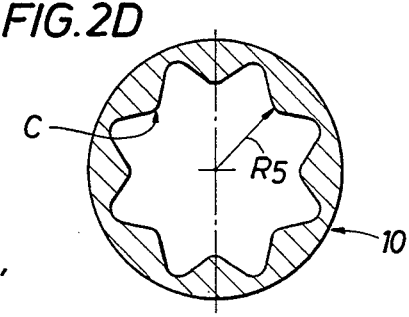
FIG. 2D is an alternative embodiment of a cross-sectional view at the outlet of a tubular reactor according to the invention that has an inlet cross-section as shown in FIG. 2A.

In one embodiment according to the invention, illustrated schematically in FIG. 2A, the inlet of reactor 10, when viewed in cross-section, shows fins of height f with crests c on the interior surface of the reactor 10. The outside radius of the reactor 10 is $R_3$, the radial distance from the center of the tube to the fin valley is $R_2$, and the radial distance from the center of the tube to the fin crest is $R_1$. For simplicity, the effective radius of the tube is defined as $R_4 0.5(R_2+R_1)$.

Figures 2B, 2E:
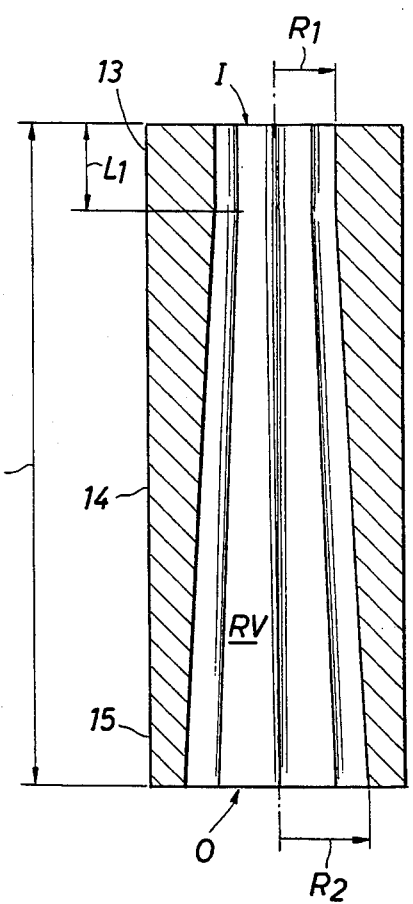
FIG. 2B is a longitudinal cross-sectional view, taken along B-B' of FIG. 2A, of a tubular pyrolysis reactor according to the invention.
FIG. 2E is a longitudinal cross-sectional view of a tubular radiant heat reactor that has an inlet as illustrated in FIG. 2A and an outlet with a cross-section that corresponds to FIG. 2D.

FIG. 2B is a cross-section taken at B—B of FIG. 2A. This longitudinal cross-section of a reactor tube 10 according to the invention, shows inlet I with outlet O and an inner reactor volume RV. The reactor tube 10 has three segments: a feedstock heating section 13, a pyrolysis section 14, and an outlet section 15.

As used in the specification and claims, the feedstock heating section is that section of the reactor tube wherein efforts are concentrated on heating the feedstock to a temperature at which pyrolysis takes place at a commercially viable rate. The pyrolysis section is that section wherein the feedstock has reached and is maintained at a temperature at which pyrolysis takes place at a commercially viable rate. The outlet section is that section from which reaction product and any unreacted feedstock is expelled from the reactor.

Figure 2C:
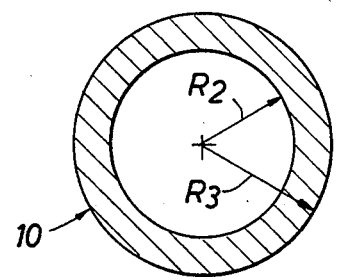
FIG. 2C is an alternative embodiment of a cross-sectional view at the outlet of a tubular reactor according to the invention that has an inlet cross-section as shown in FIG. 2A.

In the embodiment shown in FIG. 2B, the preheat section 13 has length $L_1$. In the embodiment shown, $L_1$ has the cross-sectional configuration shown in FIG. 2A with fins of height f to allow maximum heat transfer to reactor charge F. When the reactor charge F travels through reactor 10 and reaches a temperature at which pyrolysis proceeds at a rapid rate, then the embodiment of FIG. 2B shows a decrease in fin crest height c (or fin thickness f) thereby allowing an increase in reactor volume RV for any given segment of reactor length $\delta L$ throughout the pyrolysis section 14. Thus, the volume per unit length of reactor 10 increases from inlet to outlet. Preferably, this increase is continuous. At the outlet O of the embodiment shown in FIG. 2B, the fin heights f have been reduced to substantially zero so that the radius of the outlet is $R_2$. This is also illustrated in FIG. 2C. Clearly, other embodiments are also possible.

In another embodiment, the inner volume RV is increased per unit length $\delta L$ of the reactor 10 by also increasing the outside diameter from $R_3$ to $R_6$ and increasing the distance from the center of tube 10 to the tube crest from $R_1$ to $R_5$. Thus, fins of significant height are retained throughout the length $L_0$ of the reactor 10 to enhance heat transfer while the volume per unit length of the reactor increases due to increasing the effective inside radius of the reactor. A cross-section of a reactor tube of this type according to the invention is shown in FIG. 2E.

In general, the invention provides a reactor for thermally cracking hydrocarbons to produce olefins. The reactor contains at least one tube, the tube having an inlet for receiving reactor feedstock at one end and an outlet for debouching pyrolysis product and unreacted feedstock from the other end. The reactor, according to the invention, preferably has a feedstock heating section in the vicinity of the inlet, wherein the reactor is configured to enhance heat transfer from the outside of the tube to the charge within. As the feedstock travels further along the reactor, and is heated to a temperature at which pyrolysis proceeds at a significant rate, the feedstock enters a pyrolysis section of the reactor in which the volume per unit length of the reactor increases to compensate for the molar expansion of feedstock being converted to olefins. The rate of molar increase can be calculated by finite volume element analysis. This entails dividing the length of the reactor $L_0$ into discrete lengthwise elements and performing energy and mass balances over each successive element from inlet I to outlet O.

In one embodiment of the invention, the tubes have an inner surface that defines a volume within the tube for containing a reaction mixture, the inner surface being shaped to provide a high heat transfer efficiency in the vicinity of the inlet of the tube, relative to the heat transfer coefficient in the vicinity of the outlet. Further, the inner surface is shaped to provide reduced pressure drop between inlet and outlet of the tube, relative to a tube that has a uniform inner surface over its length that is identical to the inner surface in the vicinity of the tube inlet.

The following example is illustrative of the invention and does not in any way limit the scope of the invention as described above and claimed below.

a 4% reduction in radiant heat energy consumption, the invention provides an 0.9-1.36 wt. % increase in yield of ethylene and propylene, even at a run length of 45 days, as compared to shorter run lengths of 12 and 35 days with prior art tubes.

TABLE I

| Tube Type | Smooth Coil | Rifled Straight Fin Coil | Coil According to Invention | |
|---|---|---|---|---|
| Hydrocarbon | Straight Run Naphtha | Straight Run Naphtha | Straight Run Naphtha | |
| Cracking Severity | High | High | High | |
| Coil Dimensions | | | | |
| Coil length (FT) | 40 | 40 | 40 | |
| Tube Equivalent Inside Diameter (IN) (2 × Effective radius) | 1.2 | 1.2 | Inlet[1] 2 × 0.9→1.0 | Outlet 1 × 1.3→1.4 |
| No. of Fins | 0 | 8 | 8 | 0 |
| Fin heights (IN) | 0 | 0.2 | 0.22→0.10[2] | 0 |
| Fin Spiral Pitch | 0 | 0 | 0 | 0 |
| Mass Velocity (LB/SEC.SQ-FT) | 17.0 | 17.0 | 12.5 | |
| Steam/Hydrocarbon Ratio (LB/LB) | 0.45 | 0.45 | 0.45 | |
| Coil Outlet Pressure (PSIG) | 14.5 | 14.5 | 14.5 | |
| Radiant Absorbed Heat (MM BTU/H) | 0.49 | 0.49 | 0.47 | |
| Maximum Tube Metal Temperature (F.) | 1895 | 1820 | 1790 | |
| Tube Pressure Drop (PSI) | 9.5 | 12.5 | 7.8 | |
| Run Length (Days) | 12 | 35 | 45 | |
| Average Yields for Entire Cycle | wt. % | wt. % | wt. % | |
| Components | | | | |
| Hydrogen | 1.1 | 1.1 | 1.1 | |
| Methane | 16.1 | 16.0 | 15.7 | |
| Acetylene | 0.9 | 1.1 | 1.0 | |
| Ethylene | 31.2 | 31.5 | 31.6 | |
| Ethane | 3.1 | 3.2 | 3.2 | |
| Methyl Acetylene and Propadiene | 1.1 | 1.2 | 1.2 | |
| Propylene | 13.3 | 13.2 | 13.5 | |
| Propane | 0.4 | 0.3 | 0.4 | |
| 1-3 Butadiene | 5.0 | 5.1 | 5.2 | |
| Butene | 3.0 | 3.0 | 3.1 | |
| Butane | 0.3 | 0.3 | 0.3 | |
| $C_6$-$C_8$ Aromatics | 3.2 | 3.1 | 3.2 | |
| Aromatics B | 14.4 | 14.2 | 13.9 | |
| $C_6$-$C_8$ Non-Aromatics | 2.1 | 1.9 | 2.6 | |
| Fuel Oil | 4.8 | 4.8 | 4.0 | |
| Yield | 44.5 | 44.7 | 45.1 | |

[1] The coil is of the type shown in FIG. 1 with two inlet tubes, each of 0.9 inch inlet inside diameter and 1.0 inch inside diameter at the tube outlets. The outlet tube has an inlet inside diameter 1.3 inches and outlet of 1.4 inches.
[2] Fin heights decrease from 0.22 inch at inlet to 0.10 at outlet of tube. The outlet tube has no fins.

EXAMPLE 1

A finite volume element analysis was carried out on three types of reactor tubes: smooth tubes, rifled straight fin tubes, and tubes of variable volume per unit length according to the invention. The simulation utilized straight run naphtha as the hydrocarbon charge stock (specific gravity 0.71, end point 400° F., and the ratio of normal/isoparafin: olefin:naphthalene:aromatic was 38/33:0:23:6). As can be seen from the information summarized in Table I, in the reactor according to the invention, there is a substantial decrease in maximum tube metal temperature relative to the smooth tube. Table I further illustrates that reactors according to the invention have significantly lower pressure drop (7.8 psi versus 9.5-12.5 psi for finned prior art tubes). For about Although the invention has been described with reference to its preferred embodiments, those of ordinary skill in the art may, upon reading this disclosure, appreciate changes and modifications which may be made and which do not depart from the scope and spirit of the invention as described above and claimed below.

What is claimed is:

1. A reactor for thermally cracking hydrocarbons to produce olefins, the reactor comprising an enclosure having means defining a radiant heating section comprising at least one reactor tube for containing hydrocarbons and wherein said hydrocarbons are subjected to sufficient heat to cause pyrolysis, the at least one reactor tube comprising:

an inlet for receiving reactor feedstock at one end of the tube;

an outlet for debouching pyrolysis product and unreacted feedstock from another end of the tube;

a feedstock heating section in the vicinity of the tube inlet;

a pyrolysis section located between the feedstock heating section and the tube outlet; and an inner surface extending from the inlet to the outlet of the tube, the inner surface comprising fins extending from the tube inlet to the vicinity of the tube outlet with fin height decreasing from the inlet to the vicinity of the outlet, the inner surface surrounding and defining an inner volume of the reactor for containing reaction mixture, said inner volume per unit length increasing continuously from the vicinity of the inlet to the vicinity of the outlet.

2. The reactor of claim 1, wherein an equivalent internal radius at the inlet of the reactor tube is less than an equivalent internal radius at the outlet of the reactor tube.

3. The reactor of claim 1, wherein an outside radius of the reactor tube is greater in the vicinity of the outlet of the reactor tube than in the vicinity of the inlet.

4. The reactor of claim 1, wherein the fin height approximates zero in the vicinity of the outlet of the tube.

5. A reactor for thermally cracking hydrocarbons to produce olefins, the reactor comprising an enclosure with means defining a radiant heating section comprising at least one reactor tube for containing hydrocarbons and wherein said hydrocarbons are subjected to sufficient heat to cause pyrolysis, the at least one reactor tube comprising:

an inlet for receiving a reactor feedstock at one end of the tube;

an outlet for debouching pyrolysis product and unreacted feedstock from another end of the tube;

a feedstock heating section in the vicinity of the inlet;

a pyrolysis section located between the feedstock heating section and the outlet; and an inner surface defining a volume within the tube for containing a reaction mixture, the inner surface comprising fins for enhancing heat transfer to a reaction mixture, the inner surface shaped to (a) provide higher heat transfer efficiency in the vicinity of the inlet of the tube relative to the vicinity of the outlet, and (b) provide reduced pressure drop between inlet and outlet of the tube relative to a tube with an entire inner surface identical to the inner surface in the vicinity of the tube inlet;

wherein the inner volume per unit length of the reactor tube increases continuously from the vicinity of the inlet of the tube to the vicinity of the outlet of the tube.

6. The reactor of claim 5, wherein the fins have a height that decreases from the inlet to the vicinity of the outlet of the tube.

7. The reactor of claim 5, wherein an outside radius of the reactor tube is greater in the vicinity of the outlet of the reactor tube than in the vicinity of the inlet.

8. The reactor of claim 6, wherein the fin height approximates zero in the vicinity of the outlet of the tube.

9. A reactor for the pyrolysis of hydrocarbons to produce olefins, the reactor comprising an enclosure with means defining a section subject to radiant heat, the section comprising at least one reactor tube for the pyrolysis of hydrocarbons, the tube comprising:

an inlet for receiving hydrocarbon feedstock at one end of the tube;

an outlet for debouching pyrolysis product and unreacted feedstock from another end of the tube;

a feedstock heating section in the vicinity of the inlet;

a pyrolysis section located between the feedstock heating section and the outlet; and an inner surface extending from the inlet to the outlet of the tube, the inner surface comprising structure for increasing surface area and surrounding an inner volume of the reactor tube for containing a reaction mixture, the inner surface comprising at least one fin extending from the inlet of the tube to the vicinity of the outlet with fin height decreasing from the inlet of the tube to the outlet, the reactor tube having a larger equivalent diameter in the vicinity of the outlet than an equivalent diameter in the vicinity of the inlet of the reactor tube, and the volume per unit length of the tube increasing continuously from the vicinity of the reactor tube inlet to the vicinity of the reactor tube outlet.

10. The tube of claim 9 comprising an outside diameter smaller at the inlet of the tube than at the outlet of the tube.

* * * * *